3,530,140
CERTAIN PYRIDYL-HYDRAZINO-
2-YL-IMIDAZOLINES
Werner Kummer, Helmut Stähle, Herbert Köppe, and Karl Zeile, Ingelheim am Rhine, Germany, assignors to Boehringer Ingelheim G.m.b.H., Ingelheim am Rhine, Germany, a corporation of Germany
No Drawing. Filed Jan. 19, 1968, Ser. No. 699,044
Claims priority, application Germany, Jan. 20, 1967, B 90,822
Int. Cl. C07d 31/42
U.S. Cl. 260—296                                       7 Claims

ABSTRACT OF THE DISCLOSURE

The compounds are N'-heterocyclic-substituted hydrazino-imidazolines-(2) and non-toxic acid addition salts thereof, useful as blood pressure affecting agents in warm-blooded animals.

---

This invention relates to novel heterocyclic-substituted hydrazino-imidazolines-(2) and acid addition salts thereof, as well as to various methods of preparing these compounds.

More particularly, the present invention relates to N'-heterocyclic-substituted derivatives of hydrazino-imidazoline-(2) of the formula

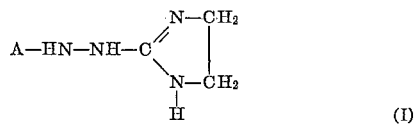

wherein A is an aromatic unsaturated 5- to 6-membered monocyclic or 9- to 10-membered condensed bicyclic heterocycle comprising from 1 to 3 heteroatoms of which at least one is a nitrogen atom and the others are oxygen or sulfur, where said heterocycle may have one or more alkyl and/or alkoxy substituents of 1 to 3 carbon atoms, chlorine, bromine or phenyl substituents attached to any substitutable ring atom, and said phenyl substituent may itself have one or more alkyl substituents of 1 to 3 carbon atoms attached thereto, and non-toxic, pharmacologically aceptable acid addition salts thereof.

Preferred illustrative examples of heterocycles embraced by the definition of A are pyridine, pyridazine, pyrimidine, pyrazine, triazine, imidazole, thiazole, oxazole, pyrazole, triazole, and condensed ring systems thereof with each other or the benzene nucleus with the limitation to ring systems having not more than 3 heteroatoms.

The compounds of the Formula I may be prepared by a number of different methods involving well known chemical principles, among which the following have proved to be particularly convenient and efficient:

Method A

By reacting a hydrazine of the formula

<p align="center">A—NH—NH₂     (II)</p> wherein A has the same meanings as in Formula I, with an alkylmercapto-imidazoline acid addition salt of the formula

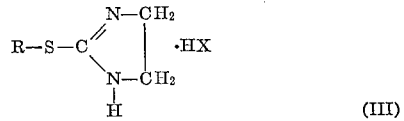

wherein R is lower alkyl, preferably methyl or ethyl, and X is the anion of an acid, preferably of a hydrohalic acid or of methanesulfonic acid.

The reaction is performed analogous to that described in J. Chem. Soc. (London), 1965, page 474, that is, by heating the reaction partners, preferably dissolved in a polar solvent such as an alcohol, to reflux temperature. The reaction forms the corresponding acid addition salt of a compound of the Formula I.

A hydrazine of the Formula II may be prepared according to conventional methods, such as those described by Rodd in "Chemistry of Carbon Compounds," volume IV, part A (Heterocyclic Compounds), 1957, for the individual heterocyclic-substituted hydrazines. The starting compounds of the Formula III and their preparation are described in J. Am. Chem. Soc. 73, 602 (1951).

Method B

By reacting an N-nitroguanidine compound of the formula

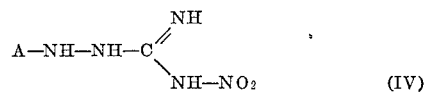

wherein A has the same meanings as in Formula I, with ethylene-diamine or an acid addition salt thereof:

The reaction is preferably carried out by refluxing a solution of the reactants in a polar solvent, such as an alcohol. When an acid addition salt of ethylenediamine is used, the end product is the corresponding imidazoline acid addition salt.

The starting compounds of the Formula IV may be prepared analogous to the method described in J. Am. Chem. Soc. 72, 5343 (1950).

Method C

By reducing an azo compound of the formula

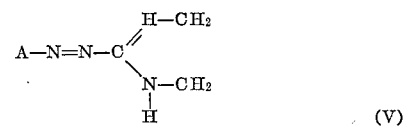

wherein A has the same meaning as in Formula I, with nascent hydrogen which is preferably generated by means of a mixture of zinc and a concentrated or dilute aqueous acid, such as formic acid or acetic acid, or with an alkali metal borohydride.

An azo compound of the Formula V may be obtained by reacting a corresponding heterocyclic-substituted nitroso compound with 2-amino-imidazoline, or by working up the mother liquors obtained in the isolation of the end products according to one of the processes indicated, whereby the azo compound is formed by air oxidation.

Method D

By reacting 2-hydrazino-imidazoline-(2) with a heterocyclic ring system A, as defined above, comprising in o- or p-position to one of the heteroatoms a group accessible for substitution, preferably a halogen atom.

This reaction proceeds analogous to the hydrazine reactions summarized in Houben-Weyl "Methoden der organischen Chemie," volume 10/2, preferably in the presence of a polar solvent, such as an alcohol or glacial acetic acid, at temperatures between room temperature and the reflux temperature of the solvent which is used, depending upon the reactivity of the substituent in the o- or p-position.

The preparation of hydrazino-imidazoline salts is described in J. Org. Chem. 18, 779 (1953).

Method E

By reacting a compound of the formula

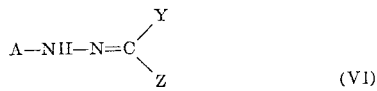
(VI)

wherein A has the same meaning as in Formula I and Y and Z represent reactive groups, which may be identical to or different from each other, preferably amino, alkylmercapto or alkoxy groups, with ethylenediamine or a salt thereof.

It is also possible to use as the starting material a compound of the formula

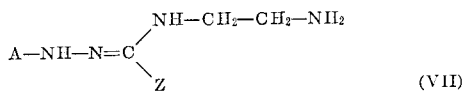
(VII)

formed as an intermediate during this reaction, which cyclizes as well under the reaction conditions indicated below.

The reaction is performed, depending upon the meanings of Y and Z, either in an inert organic solvent, such as ether, benzene or toluene, or in a polar solvent, such as an alcohol, until cyclization has been achieved. The required temperatures depend upon the reactivity of the starting material of the Formula VI which is used.

The heterocyclic-substituted 2-hydrazino-imidazolines-(2) of the Formula I according to the instant invention are organic bases and therefore form acid addition salts with inorganic or organic acids. Examples of nontoxic, pharmacologically acceptable acid addition salts are those formed with hydrochloric acid, hydrobromic acid, hydroiodic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, ascorbic acid, 8-chloro-theophylline and the like.

The following examples further illustrate the present invention and will enable others skilled in the art to understand it more completely. It should be understood, however, that the present invention is not limited solely to the examples given below.

EXAMPLE 1

Preparation of 2-[5'-chloropyridyl-(2')-hydrazino]-imidazoline-(2) hydroiodide by method A A mixture of 7.16 gm. (0.05 mol) of 2-hydrazino-5-chloro-pyridine (M.P. 127–128° C.), 12.2 gm. (0.05 mol) of 2-methylmercapto-imidazoline-(2) hydroiodide and 50 cc. of amyl alcohol was refluxed for one and a half hours. Thereafter, the reaction solution was allowed to cool, and the precipitate formed thereby was collected by vacuum filtration, yielding 11 gm. (65% of theory) of a filter cake which was recrystallized from methanol and methanol/ether. A pure white substance having a melting point of 177–178° C. was obtained; it was identified to be 2-[5'-chloropyridyl-(2')-hydrazino]-imidazoline-(2) hydroiodide of the formula

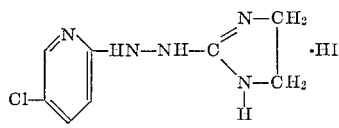

EXAMPLE 2

Preparation of 2-[pyridyl-(2')-hydrazino]-imidazoline-(2) hydroiodide by method A 1.5 gm. of 2-hydrazino-pyridine and 3.26 gm. of 2-methylmercapto-imidazoline-(2) hydroiodide were dissolved in 20 cc. of amyl alcohol, and the solution was refluxed for one hour. Thereafter, the reaction solution was cooled, and the precipitate formed thereby was collected, yielding 3.05 gm. (76.5% of theory) of raw 2-[pyridyl-(2')-hydrazino]-imidazoline-(2) hydroiodide which, after recrystallization from ethanol and ethanol/ether, had a melting point of 202–203° C.

EXAMPLE 3

Preparation of 2-[3',5'-dichloro-pyridyl-(2')-hydrazino]-imidazoline-(2) hydroiodide by method A A mixture of 8.9 gm. (0.05 mol) of 2-hydrazino-3,5-dichloro-pyridine (M.P. 176° C.), 12.2 gm. of 2-methylmercapto-imidazoline-(2) hydroiodide and 50 cc. of amyl alcohol was refluxed for two hours. Thereafter, the reaction solution was allowed to cool, whereupon 8.5 gm. (45.5% of theory) of raw 2-[3',5'-dichloro-pyridyl-(2')-hydrazino]-imidazoline-(2) hydroiodide crystallized out. The raw product was collected, dissolved in methanol, reprecipitated by adding ether to the solution, and recrystallized from isoamyl alcohol. The analytically pure product had a melting point of 219–220° C.

EXAMPLE 4

Using a procedure analogous to that described in Example 1, 2-[3'-chloro-pyridyl-(2')-hydrazino]-imidazoline-(2) hydroiodide, M.P. 276–277° C. (recrystallized from ethanol), was prepared from 2-hydrazino-3-chloropyridine (M.P. 162° C.) and 2-methylmercapto-imidazoline-(2) hydroiodide. The yield was 19.4% of theory.

EXAMPLE 5

Preparation of 2-[5'-bromo-pyridyl-(2')-hydrazino]-imidazoline-(2) and its hydrochloride by method A A mixture of 6.58 gm. (0.035 mol) of 2-hydrazino-5-bromo-pyridine (M.P. 131–133° C.), 8.54 gm. (0.035 mol) of 2-methylmercapto-imidazoline-(2) hydroiodide and about 50 cc. of amyl alcohol was refluxed for one and a half hours. Thereafter, the reaction solution was cooled, whereby 9.5 gm. (70.8% of theory) of crystalline 2-[5'-bromo-pyridyl-(2')-hydrazino]-imidazoline-(2) hydroiodide precipitated out. The crystals were collected, dissolved in water, and the aqueous solution was made alkaline with dilute sodium hydroxide, whereby the free base precipitated which was recrystallized from methanol and thereupon had a melting point of 194–195° C. The free base was dissolved in methanol and the resulting solution was acidified with ethereal hydrochloric acid, yielding 2-[5'-bromo-pyridyl-(2')-hydrazino]-imidazoline-(2) hydrochloride, M.P. 227–235° C., of the formula

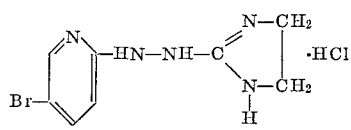

EXAMPLE 6

Preparation of 2-[quinolyl-(2')-hydrazino]-imidazoline-(2) hydroiodide by method A A mixture of 8.85 gm. of 2-hydrazino-quinoline, 12.2 gm. of 2-methylmercapto-imidazoline-(2) hydroiodide and 35 cc. of amyl alcohol was boiled for one and a half hours. Thereafter, the reaction solution was cooled, whereby 11 gm. (61.8% of theory) of raw 2-[quinolyl-(2')-hydrazino]-imidazoline-(2) hydroiodide precipitated out. The precipitate was collected, recrystallized from methanol and stirred with ethanol. The purified product had a melting point of 245–248° C. and the formula

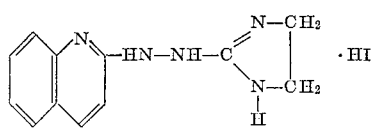

EXAMPLE 7

Using a procedure analogous to that described in Example 1, 2-[pyrimidyl-(2')-hydrazino]-imidazoline-(2) hydroiodide, M.P. 243° C., of the formula

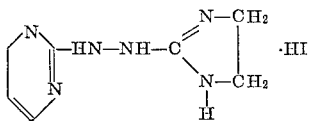

was prepared from 2-hydrazino-pyrimidine and 2-methyl-mercapto-imidazoline - (2) hydroiodide. The yield was 41.3% of theory.

EXAMPLE 8

Using a procedure analogous to that described in Example 6, 2-[3'-methyl-quinoxalinyl-(2')-hydrazino]-imidazoline-(2) hydroiodide, M.P. 266–267° C., of the formula

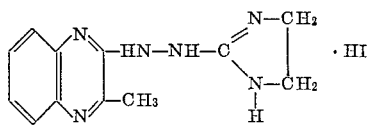

was prepared from 2-hydrazino-3-methyl-quinoxaline and 2-methylmercapto-imidazoline-(2) hydroiodide. The yield was 46.7%.

EXAMPLE 9

Using a procedure analogous to that described in Example 5, 2-[benzothiazolyl - (2')-hydrazino]-imidazoline-(2) dihydrochloride·½H$_2$O M.P. 238–239° C., of the formula

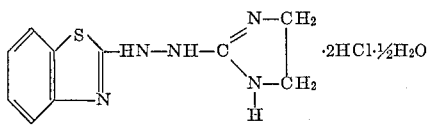

was prepared from 2-hydrazino-benzothiazole and 2-methyl-mercapto-imidazoline-(2) hydroiodide. The yield was 21.0% of theory.

EXAMPLE 10

Using a procedure analogous to that described in Example 5, 2-[6'-chloro-pyridyl - (2') - hydrazino]-imidazoline-(2) hydrochloride, M.P. 231–233° C., was prepared from 2-hydrazino - 6-chloro-pyridine and 2-methylmercapto-imidazoline-(2) hydroiodide. The yield was 36.0% of theory.

EXAMPLE 11

Preparation of 2-[5'-chloropyridyl-(2')-hydrazino]-imidazoline-(2) p-toluene-sulfonate by method B A mixture of 5.1 gm. (0.022 mol) of N-(5-chloro-pyridyl-2-amino)-N'-nitroguanidine, M.P. 185–186° C., 4.5 gm. (0.011 mol) of ethylene-diaminedi-p-toluenesulfonate, 0.66 gm. (0.011 mol) of ethylene-diamine and 60 ml. of ethanol was boiled for five hours. Thereafter, the reaction solution was evaporated to 25 ml., and the ether was added cautiously. 5.4 gm. (64% of theory) of raw 2-[5'-chloro-pyridyl - (2')-hydrazino]-imidazoline-(2) p-toluene-sulfonate crystallized out, which were purified by recrystallization from ethanol, water and ethanol-ether. The pure product had a melting point of 207–208° C.

The starting material, i.e. N-(5-chloropyridyl-2-amino)-N'-nitroguanidine, was prepared by allowing a mixture of equimolar quantities of 5-chloro-2-hydrazino-pyridine and N-methyl-N-nitroso-N'-nitroguanidine in 75%-ethanol to stand at room temperature for five hours; after recrystallization from aqueous methanol, it melted while decomposing at 185–186° C.

EXAMPLE 12

Preparation of 2-[5'-bromo-pyrimidyl-(2')-hydrazino]-imidazoline-(2) hydroiodide by method D 2.25 gm. (0.098 mol) of metallic sodium were dissolved in 50 cc. of ethanol and the resulting solution was added dropwise to a solution of 22.8 gm. (0.10 mol) of 2-hydrazino-imidazoline - (2) hydroiodide in 100 cc. of ethanol at room temperature, while stirring. Thereafter, 9.65 gm. (0.05 mol) of 2-chloro-5-bromo-pyrimidine dissolved in 50 cc. of ethanol were added dropwise over a period of 10 minutes at 20° C., and the mixed solution was stirred for 3 hours at 20° C. and then another ½ hour at 50° C. After cooling to 10° C., the reaction solution was acidified with a solution of hydrogen chloride in ether, and the solvent was distilled off. The residue was suspended in 80 cc. of water, the suspension was filtered, and the filter cake was recrystallized from methanol. 8.1 gm. of 2-[5' - bromo-pyrimidinyl-(2')-hydrazino]imidazoline-(2) hydroiodide (43% of theory) were obtained. For further purification the product was recrystallized from aqueous methanol and from water in the presence of activated charcoal, yielding 3.4 gm. (18.7% of theory) of the pure product having a melting point of 211° C. (decomposition).

EXAMPLE 13

Preparation of 2-[benzo-thiazolyl-(2')-hydrazino]-imidazoline-(2) dihydrochloride by method D 2.25 gm. (0.098 mol) of sodium were dissolved in 50 cc. of ethanol, and the solution was added dropwise at 20° C. to a solution of 22.8 gm. (0.10 mol) of 2-hydrazino-imidazoline-(2) hydroiodide in 100 cc. of ethanol, while stirring. Thereafter, a solution of 8.5 gm. (0.05 mol) of 2-chloro-benzo-thiazole in 50 cc. of ethanol was added dropwise at 20° C., and stirring was continued for another hour at 60–70° C. After cooling the reaction solution to 10° C., it was acidified with concentrated hydrochloric acid, and the ethanol and water were evaporated in vacuo. The crystalline residue was extracted first with ether and then with water. The aqueous extract solution was evaporated to 25 cc. and the free base was precipitated with aqueous sodium hydroxide. The free base was collected on a vacuum filter, thoroughly washed with water, dissolved in methanol, and converted with ethereal hydrochloric acid into its dihydrochloride. After recrystallization from methanol-ether 0.5 gm. (3.2% of theory) of 2-[benzothiazolyl-(2')-hydrazino]-imidazoline-(2) dihydrochloride was obtained, which crystallized with half a molecule of water of crystallization and had a melting point of 238–239° C.

EXAMPLE 14

Preparation of 2-[3'-chloro-pyridazinyl-(6')-hydrazino]-imidazoline-(2) hydrochloride by method D 2.25 gm. (0.098 mol) of sodium were dissolved in 50 cc. of ethanol and the solution was added dropwise at 20° C. to a solution of 22.8 gm. (0.10 mol) of 2-hydrazino-imidazoline-(2) hydroiodide in 100 cc. of ethanol, while stirring. Thereafter, a solution of 7.45 gm. (0.05 mol) of 3,6-dichloro-pyridazine in 50 cc. of ethanol was added dropwise at 20° C., and the mixed solution was stirred for ½ hour at 20° C. and subsequently for 2 hours at 60–70° C. After cooling it to 10° C., the reaction solution was acidified with hydrochloric acid and the ethanol and water were evaporated. The residue was first extracted with ether and then with water, the aqueous extract solution was evaporated to 25 cc., and the free base was precipitated with aqueous sodium hydroxide. The free base was thoroughly washed with water on a vacuum filter and was then dissolved in methanol. The methanolic solution was acidified with ethereal hydrochloric acid, whereby 1.8 gm. (14.5% of theory) of 2-[3'-chloro-pyridazinyl - (6') - hydrazino]-imidazoline-(2) hydrochloride precipitated out, which was recrystallized from aqueous ethanol and methanol/acetone several times, whereupon it had a melting point of 285° C. (decomposition).

EXAMPLE 15

Preparation of 2-[5'-chloro-pyridyl-(2')-hydrazino]-imidazoline-(2) by method C 105 mgm. (0.0005 mol) of 2-[5'-chloro-pyridyl-(2')-azo]-imidazoline-(2), M.P. 150–151° C., were dissolved in a mixture of 3 cc. of methanol and 0.5 cc. of formic acid. While cooling the solution to 10–20° C. an aqueous solution of sodium borohydride is added dropwise until the dark red color changed to a light yellow. The reaction solution was diluted with 3 cc. of water, and 2-[5'-chloro-pyridyl-(2')-hydrazino]-imidazoline was precipitated by adding dilute sodium hydroxide thereto. The free base was quickly collected by vacuum filtration and washed thoroughly with water. 72 mgm. of the free base were obtained; after recrystallization from ethanol it had a melting point of 186° C.

EXAMPLE 16

Preparation of 2-[5'-chloro-pyridyl-(2')-hydrazino]-imidazoline-(2) by method C 210 mgm. (0.001 mol) of 2-[5'-chloro-pyridyl-(2')-azo]-imidazoline, M.P. 150–151° C., were dissolved in 6 cc. of aqueous 10% acetic acid and, while shaking, zinc powder was added in small portions. As soon as the color of the solution changed to yellow, the zinc powder was filtered off, and the filtrate was made weakly alkaline with dilute sodium hydroxide. The voluminous precipitate was collected by vacuum filtration and washed thoroughly with water. The 1-[5'-chloro-pyridyl-(2')-hydrazino]-imidazoline-(2) contained therein was extracted with methanol. The methanol was distilled off under exclusion of oxygen, yielding the free base, M.P. 186° C. When the methanolic extract solution was acidified with ethereal hydrochloric acid, the dihydrochloride, M.P. 232–235° C. (decomposition), was obtained.

EXAMPLE 17

Preparation of 2-[5'-phenyl-1',2',4'-triazolyl-(3')-hydrazino]-imidazoline-(2) by method E 15.0 gm. (0.04 mol) of 5-phenyl-3-(S-methyl-isothiosemicarbazido)-1,2,4-triazole hydroiodide, M.P. 207–208° C., and 3.6 gm. (0.06 mol) of ethylenediamine were dissolved in 80 cc. of isoamyl alcohol, and the solution was refluxed for 2 hours. Thereafter, the isoamyl alcohol was distilled off in vacuo, and the residue was recrystallized several times from water and ethanol. 1.2 gm. (12.5% of theory) of 2-[5'-phenyl-1',2',4'-triazolyl-(3')-hydrazino]-imidazoline-(2), M.P. 200° C., of the formula

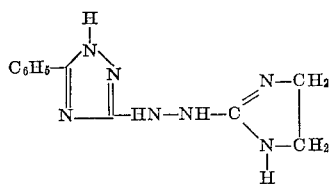

were obtained.

EXAMPLE 18

Preparation of 2-[5'-p-tolyl-1',2',4'-triazolyl-(3')-hydrazino]-imidazoline-(2) and its dihydrochloride by method E The reaction was performed analogous to that described in Example 17, starting from 5-p-tolyl-3-(S-methyl-isothiosemicarbazido)-1,2,4-triazole hydroiodide and ethylenediamine. In order to prepare the dihydrochloride, the free base was dissolved in ethanol, and the ethanolic solution was acidified with ethereal hydrochloric acid. After having been recrystallized twice from ethanol/ether, the dihydrochloride had a melting point of 276° C. (decomposition). The yield was 14.5% of theory.

EXAMPLE 19

Preparation of 2-[5',6'-dimethyl-1',2',4'-triazinyl-(3')-hydrazino]-imidazoline-(2) hydroiodide by method A 2.8 gm. (0.02 mol) of 3-hydrazino-5,6-dimethyl-1,2,4-triazine and 4.88 gm. (0.02 mol) of 2-methylmercapto-imidazoline-(2) hydroiodide were dissolved in 30 cc. of amyl alcohol, and the solution was boiled for one hour. The 2-[5',6'-dimethyl - 1',2',4' - triazinyl-(3')-hydrozino]-imidazoline-(2) hydroiodide which crystallized out during the reaction, and especially after the reaction solution had cooled, was recrystallized several times from methanol/ether and water. 2.1 gm. (31.4% of theory) of the compound, M.P. 208–210° C., were obtained.

EXAMPLE 20

Using a procedure analogous to that described in Example 19, 2-[phthalazinyl-(1')-hydrazino]-imidazoline-(2) hydroiodide, M.P. 316–218° C. (recrystallized from water and 90% ethanol), of the formula

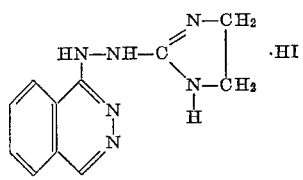

was prepared from 1-hydrazino-phthalazine and 2-methylmercapto-imidazoline-(2) hydroiodide, using ethanol as the solvent instead of amyl alcohol. The yield was 6.4% of theory.

EXAMPLE 21

Using a procedure analogous to that described in Example 19, 2-[2' - methyl - imidazo(1,2 - b)pyridazinyl-(6')-hydrazino]-imidazoline-(2) hydroiodide, M.P. 303° C. (decomposition) after recrystallization from water and from ethanol, of the formula

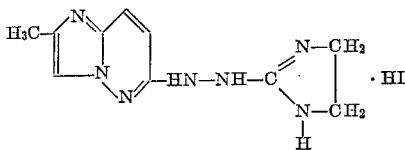

was prepared from 2-methyl-6-hydrazino-imidazo[1,2-b]pyridazine and 2-methylmercapto-imidazoline-(2). The yield was 14% of theory.

The compounds according to the present invention, that is, those embraced by Formula I above and their non-toxic, pharmacologically acceptable acid addition salts, have useful pharmacodynamic properties. More particularly, they exhibit blood pressure affecting activities in warm-blooded animals, such as rabbits.

The activity of the compounds according to the present invention was ascertained by in vivo tests on anesthetized rabbits whose blood pressure was continuously measured with the aid of a mercury manometer connected to the arteria carotis before and after intravenous administration of the compound under investigation. The subcutaneous median lethal dose ($LD_{50}$) was also determined in mice. The following table shows the results obtained.

TABLE

| Compound (Example No.) | Dose mgm./kg. | Change in blood pressure, mm.Hg | $LD_{50}$ (mouse), mgm./kg., s.c. |
|---|---|---|---|
| 1 | 0.01 | −4 | 1,060 |
|   | 0.03 | −15 |   |
|   | 0.1  | −28 |   |
|   | 0.3  | −34 |   |
| 2 | 0.03 | +25 |   |
|   | 0.1  | +33 |   |
|   | 0.3  | +41 |   |
|   | 1    | +59 |   |
|   | 3    | +61 |   |
| 3 | 0.1  | −5  | 350 |
|   | 0.3  | −9  |   |
|   | 1    | −17 |   |
|   | 3    | −18 |   |
| 4 | 1    | −2  | 890 |
|   | 3    | −9  |   |
| 5 | 0.03 | −17 |   |
|   | 0.1  | −27 |   |
|   | 0.3  | −32 |   |
|   | 1    | −40 |   |
|   | 3    | −45 |   |
| 6 | 0.03 | −7  | 1,060 |
|   | 0.1  | −21 |   |
|   | 0.3  | −29 |   |
|   | 1    | −33 |   |
| 7 | 0.1  | +5  | 1,160 |
|   | 0.3  | +9  |   |
|   | 1    | +22 |   |
|   | 3    | +54 |   |
|   | 10   | +61 |   |
| 8 | 0.3  | −4  | [1] 49 |
|   | 1    | −16 |   |
|   | 3    | −36 |   |
| 9 | 0.1  | −13 | 310 |
|   | 0.3  | −24 |   |
|   | 1    | −27 |   |
| 10 | 0.003 | −12 |   |
|    | 0.03  | −18 |   |
|    | 0.3   | −26 |   |
| 12 | 0.1   | +8  |   |
|    | 0.3   | +11 |   |
| 18 | 1     | −10 | > [2] 330 |
|    | 3     | −21 |   |
| 19 | 0.3   | −18 |   |
|    | 1     | −24 |   |
|    | 3     | −30 |   |
| 20 | 0.3   | −5  |   |
|    | 1     | −10 |   |
|    | 3     | −22 |   |
| 21 | 0.03  | −5  |   |
|    | 0.1   | −7  |   |
|    | 0.3   | −21 |   |
|    | 1     | −39 |   |
|    | 3     | −42 |   |

[1] Intravenous.
[2] By mouth.

For pharmaceutical purposes, the compounds of the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, wafers, capsules, solutions, suspensions, emulsions, powders, suppositories and the like. In addition to a compound according to the present invention, such a dosage unit composition may also contain an effective amount of one or more other hypotensive or hypertensive ingredients, such as a benzothiadiazine, or also one or more active ingredients having another pharmacodynamic activity, such as a spasmolytic and/or a psychosedative. One effective dosage unit of the compounds according to the present invention is from 0.00083 to 1.67 mgm./kg. body weight.

The following examples illustrate dosage unit compositions comprising a compound of the present invention as an active ingredient, and represent the best mode contemplated of putting the invention to practical use. The parts are parts by weight unless otherwise specified.

EXAMPLE 22

Coated pills

The pill core composition was compounded from the following ingredients:

| | Parts |
|---|---|
| 2-[5′-chloro-pyridyl-(2′)-hydrazino]-imidazoline-(2)·HI | 1 |
| Lactose | 74 |
| Corn starch | 125 |
| Sec. calcium phosphate | 40 |
| Soluble starch | 3 |
| Magnesium stearate | 3 |
| Colloidal silicic acid | 4 |
| Total | 250 |

Compounding procedure

The imidazoline compound was admixed with part of the inert ingredients, the mixture was kneaded thoroughly with an aqueous solution of the soluble starch and granulated in customary fashion through a screen. The granulate was admixed with the remaining excipients and pressed into pill cores of 250 mg. of weight, which were then coated in conventional manner with a mixture of sugar, talcum and gum arabic. One coated pill contained 1 mgm. of the imidazoline compound and, when administered perorally to a warm-blooded animal of about 60 kg. body weight in need of such treatment, produced very good hypotensive effects.

EXAMPLE 23

Hypodermic solution

The solution was compounded from the following ingredients:

2-[5′ - chloro - pyridyl-(2′)-hydrazino]imidazoline·HI— 0.5 part.
Sodium chloride—18.0 parts.
Distilled water—q.s.ad 2000.0 parts by volume.

Compounding procedure

The imidazoline compound and the sodium chloride were dissolved in the distilled water, and the filtered solution was filled into 2 cc. glass ampules in an atmosphere of nitrogen. The filled ampules were sterilized for 20 minutes at 120° C. and then sealed. One ampule contained 0.5 mgm. of the imidazoline compound, and when the contents thereof were administered intravenously to a warm-blooded animal of about 60 kg. body weight in need of such treatment, very good hypotensive effects were obtained.

Although the above dosage unit examples illustrate only one particular compound according to the present invention as an active ingredient, it should be understood that any other compound embraced by Formula I or a non-toxic, pharmacologically acceptable acid addition salt thereof may be substituted for the particular imidazoline compound in Examples 22 and 23. Moreover, the amount of active ingredient in these examples may be varied to achieve the effective dosage unit range set forth above, and the amounts and nature of the inert carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

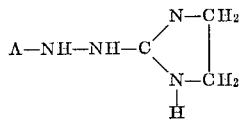

wherein A is pyridyl, chloropyridyl, bromopyridyl, dichloropyridyl,
or a non-toxic, pharmacologically acceptable acid addition salt thereof.

2. A compound according to claim 1, wherein A is 5-chloro-pyridyl-(2).
3. A compound according to claim 1, wherein A is pyridyl-(2).
4. A compound according to claim 1, wherein A is 3,5-dichloro-pyridyl-(2).
5. A compound according to claim 1, wherein A is 3-chloro-pyridyl-(2).
6. A compound according to claim 1, wherein A is 5-bromo-pyridyl-(2).
7. A compound according to claim 2, wherein A is 6-chloro-pyridyl-(2).

References Cited

1546(67) Jan. 25, 1967, Japan, Sawa abstracted by Chem. Abstracts, vol. 66, Par. 85, 791, May 1967.

1548(67) Jan. 25, 1967, Japan, Sawa et al., abstracted by Chem. Abstracts, vol. 66, Par. 95, 042, May 1967.

ALAN L. ROTMAN, Primary Examiner

U.S. Cl. X.R.

260—248, 250, 256.4, 288, 305, 307, 308, 309, 310; 424—249, 250, 251, 258, 263, 270, 272, 273

PO-1050
(5/69)

UNITED STATES PATENT OFFICE
CERTIFICATE OF CORRECTION

Patent No. 3,530,140      Dated September 22, 1970

Inventor(s) Werner Kummer, Helmut Stähle, Herbert Köppe and Karl Zeile

It is certified that error appears in the above-identified patent and that said Letters Patent are hereby corrected as shown below:

Col. 2, line 40, correct the formula to read

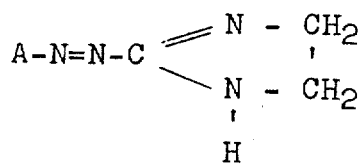

Col. 2, line 64, "10/2" should read --102--.

Col. 6, lines 42 and 71, "and water were" should read --was--.

Col. 11, correct the formula to read

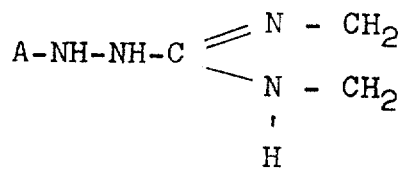

Col. 11, first line after formula, comma after "bromopyridyl" should be --or--.

SIGNED AND
SEALED
JAN 5 1971

(SEAL)
Attest:

Edward M. Fletcher, Jr.
Attesting Officer

WILLIAM E. SCHUYLER, JR.
Commissioner of Patents